United States Patent Office 3,236,819
Patented Feb. 22, 1966

3,236,819
BORAZOLE SULFUR RESINS AND METHODS OF MAKING THE SAME
Richard H. Toeniskoetter, Parma Heights, and Rostislav Didchenko, Cleveland, Ohio, assignors to Union Carbide Corporation, New York, N.Y., a corporation of New York
No Drawing. Filed Feb. 27, 1961, Ser. No. 91,595
20 Claims. (Cl. 260—79)

This invention relates to condensation products of borazoles with sulfur-containing compounds.

Borazoles are compounds having the general formula:

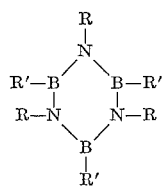

wherein R is a hydrogen or an alkyl or an aryl radical, R' is a hydrogen, halogen, amino or hydrocarbyl radical such as the alkyl or aryl radicals. The substituents of the ring are named with "N" and/or "B-" prefixes to designate their positions. Thus for example a borazole where each R' is a chlorine radical and each R is a methyl group is called "B-trichloro-N-trimethylborazole."

The main object of this invention is to provide polymeric substances based on borazole and sulfur.

The polymers of the invention may be linear, in which case recurring units are defined by the formula:

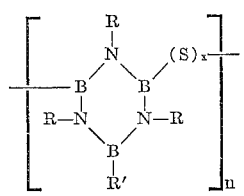

wherein R is hydrogen or an alkyl or aryl radical, R' is hydrogen, a hydrocarbyl radical such as alkyl or aryl, or an amino radical $x$ is 1 to 4 inclusive and $n$ ranges from 2 to about 20,000 with a suitable range being from 2 to about 200. The present polymers also may be cross linked at the R' position to a degree varying with reaction conditions. In that case, they are defined by the formula: $[(S_x)_yCl_{3-y}[BN]_3R_3]_n$ with the disclosed subscripts having the indicated connotation and with $y$ ranging from 1 to 3.

Among the borazole reactants suitable in the practice of the invention are B-trichloro-N-trimethylborazole, B-dichloro-B-methyl-N-trimethyl-borazole, B-trichloro-N-triphenylborazole, B-dichloro-B-methyl-N-triphenylborazole, and the like. The B-trichloroborazoles may be prepared in accordance with the procedure of Jones and Kenney (Journal of Am. Chem. Soc., 61, 1378 [1939]) using boron trichloride and the desired primary amine, or by the method of Brown and Laubengayer (Journal of Am. Chem. Soc., 77, 3699 [1955]) using boron trichloride and the appropriate primary amine hydrochloride. The B-dichloroborazoles may be prepared by partial substitutive alkylation of the B-trichloroborazoles with Grignard reagents. The boron-chlorine bond of B-chloroborazoles is labile and reacts with water, amines, alcohols, Grignard reagents and various organometallic compounds.

Among the sulfur-containing compounds which are suitable in the practice of the invention are anhydrous sodium sulfide, $Na_2S$, sodium disulfide, $Na_2S_2$, sodium tetrasulfide, $Na_2S_4$, and the like.

The polymerization reactions are carried out under anhydrous and oxygen-free conditions, in tetrahydrofuran (B.P. 85° C.) or other higher boiling ethers used at their reflux temperatures. The borazoles are soluble in tetrahydrofuran and 1,2-dimethoxyethane, but sodium sulfide, sodium disulfide, and sodium tetrasulfide are insoluble in both solvents; hence, the reactions are heterogeneous. Rapid stirring is recommended for it ensures maximum contact of the reactants and thereby increases the speed of the reaction, which is, nevertheless, slow.

The molar ratio of sodium sulfide (disulfide or tetrasulfide) to borazole must be regulated to a figure close to unity in order to obtain high polymer formation. When the ratio of sulfide to borazole exceeds 1.5, the reaction terminates at a lower average molecular weight because the end groups are blocked by B—SNa groups. In this case, the molecules become insoluble also.

The polymers produced by the present methods are soluble in a wide variety of organic solvents, including ethers, benzene, toluene, chlorobenzene, chloroform, carbon tetrachloride, acetone, etc. Protic solvents, such as water, amines, alcohols, etc., attack the B—Cl bond and therefore alter the polymer composition, although not necessarily destroying the polymer structure.

When B-trichloroborazoles are condensed with sodium sulfide or a sodium polysulfide, sol and gel polymer fractions are obtained in accord with the theory of polycondensation reactions. The sol, or soluble, fraction consists of the low molecular weight species which contain linear and cross-linked molecules and the insoluble gel fraction contains the highly cross-linked high molecular weight species. Because the gel fraction is insoluble in solvents which do not decompose it, separation from the coproduct sodium chloride has not been possible. The sol polymer fractions, however, have been characterized according to analysis, melting range, physical state and other properties. Data for the reactions are shown in Table I. In tetrahydrofuran medium, a 70 to 150 hour reaction time gives the highest yield of sol polymer. Increasing the reaction time increases the amount of gel polymer formed and therefore decreases the yield of soluble polymer. The reactions are more rapid in 1,2-dimethoxyethane and other high boiling polyethers.

In general, the polymers are amorphous to X-rays. A few weak, broad, diffraction lines have been observed in most cases, indicating a low degree of crystallinity.

Elemental analysis characterizes the polymers as consisting of borazole units linked together by —S—, or —$S_2$— or —$S_4$— groups at the boron atoms. The structure is confirmed by the infrared spectra which shows that the borazole ring remains intact in the polymers.

The physical state of the polymers is determined by the solvent medium employed and by the reaction time. The polymers are all yellow to orange with wide melting point ranges. Waxes, resins and pitches have been obtained. The pitches are brittle and melt below 100° C. They do, however, possess a finite viscosity at room temperature for they fuse to a single mass of material on standing for a few days.

Average molecular weights were calculated through end group analysis (residual chlorine in the polymers). Since no evidence of terminal —SNa groups was noted, the number average molecular weights was calculated using the formula:

$$P_n = \frac{1}{1 - f\frac{p}{2}}$$

where $p$ is the ratio of chlorine consumed to original chlorine present in the monomer and $f$, the functionality, is three.[1]

The boron-chlorine bond retains its reactivity in the polymer molecules. This is evidenced by sensitivity to water. Amination with ammonia, or a primary or secondary amine, replaces all the chlorine by $NR_2$ groups. In a particular example cited, the aminated polymer possessed rubbery properties. The B—Cl bond may also be alkylated with Grignard reagents.

B-methyl-B-dichloro-N-trimethylborazole and B-methyl-B-dichloro-N-triphenylborazole have been condensed with $Na_2S$, $Na_2S_2$ and $Na_2S_4$ to high molecular weight polymers of the composition shown. Analysis and infrared spectra are in accord with the presumed structure. Data for the reactions are shown in Table II.

1,2-dimethoxyethane, B.P. 86° C., is a suitable solvent for the polymerization reactions. Other high boiling polyethers or tetrahydrofuran may also be used. Reaction times of from 24 to 120 hours have been employed, but longer times would increase the average molecular weights of the polymers. Yields of the polymers are generally above 70 percent, although the physical nature of the monosulfide linked polymers may make their recovery difficult.

Average molecular weights of these polymers were calculated from end group analysis (chlorine) and molecular weights as high as 52,000 have been observed for the tetrasulfide linked materials.

The polymers from the difunctional borazoles are moderately resistant to hydrolysis, a property due to the low chlorine content. Samples of these materials will be only partially hydrolyzed after several days contact with water and hydrolysis with hot 1N sodium hydroxide solution requires several hours duration. The disulfide and tetrasulfide linked polymers split out part of the sulfur as free sulfur on alkaline hydrolysis.

When heated above 250° C., the polymers darken in color. The tetrasulfide polymers split out part of their sulfur above 250° C. Under high vacuum, only minor amounts of solids are sublimed out below 250° C. Decomposition occurs above 300° C.

The sulfide linked polymers are stable to oxidation by air in 1,2-dimethoxyethane at 85° C., and to oxidation by pure oxygen at temperatures below 200° C.

EXAMPLES (1) *Condensation of a B-trichloro-N-trimethylborazole with sodium sulfide*

A 200 ml. flask equipped with stirrer and reflux condenser was thoroughly flushed with dry nitrogen. The flask was then charged with 5.0 grams of B-trichloro-N-trimethylborazole, 1.72 grams of $Na_2S$, and 175 ml. of 1,2-dimethoxyethane (freshly distilled from $LiAlH_4$ in $N_2$ atmosphere). With continuous rapid stirring, the solution was heated at reflux for 120 hours. When the reaction was complete, solvent was carefully distilled off and the total solid product thoroughly dried under vacuum. The solid mixture was then transferred to a paper extraction thimble and extracted with 1,2-dimethoxyethane in a Soxhlet apparatus. The extractant was concentrated by distillation at normal pressure and dried at reduced pressure. To ensure elimination of all traces of solvent, the product was heated to 45° C. for one hour under vacuum. The product was 2.2 grams (53% yield) of pale yellow, brittle powder which melted between 90–95° C. without decomposition. Analysis of the polymer indicated a number-average molecular weight of 3.44 corresponding to an average molecular weight of approximately 600.

The X-ray diffraction pattern of the polymer showed it to be amorphous. The infrared spectrum of the polymer exhibited the borazole band at 6.7 M.

(2) *Condensation of B-trichloro-N-trimethylborazole with sodium disulfide*

A 200 ml. flask equipped with stirrer and reflux condenser was thoroughly flushed with dry nitrogen. The flask was then charged with 5.0 grams of B-trichloro-N-trimethylborazole, 2.43 grams of $Na_2S_2$, and 175 ml. of 1,2-dimethoxyethane (freshly distilled from $LiAlH_4$ in $N_2$ atmosphere). With continuous rapid stirring, the solution was heated at reflux for 120 hours. When the reaction was complete, solvent was carefully distilled off and the total solid product thoroughly dried under vacuum. The solid mixture was then transferred to a paper extraction thimble and extracted with 1,2-dimethoxyethane in a Soxhlet apparatus. The extractant was concentrated by distillation at normal pressure and dried at reduced pressure. To ensure elimination of all traces of solvent, the product was heated to 45° C. for one hour under vacuum. The product was 3.4 grams (70% yield) of yellow, brittle powder which melted between 105–125° C. without decomposition. Analysis of the polymer indicated a number-average molecular weight of 31.3 corresponding to an average molecular weight of approximately 6500.

The polymer was amorphous by X-ray analysis and showed the typical borazole bands in the infrared spectrum.

(3) *Condensation of B-trichloro-N-trimethylborazole with sodium tetrasulfide*

A 200 ml. flask equipped with stirrer and reflux condenser was thoroughly flushed with dry nitrogen. The flask was then charged with 5.0 grams of B-trichloro-N-trimethylborazole, 3.85 grams of $Na_2S_4$, and 100 ml. of tetrahydrofuran (freshly distilled from $LiAlH_4$ in $N_2$ atmosphere). With continuous rapid stirring, the solution was heated at reflux for 24 hours. When the reaction was complete, solvent was carefully distilled off and the total solid product thoroughly dried under vacuum. The solid ---
[1] Physical Chemistry of High Polymeric Systems, by H. Mark and A. V. Tobolsky, Interscience Publishers, Inc., New York, 2nd Ed., 1950.

mixture was then transferred to a paper extraction thimble and extracted with 1,2-dimethoxyethane in a Soxhlet apparatus. The extractant was concentrated by distillation at normal pressure and dried at reduced pressure. To ensure elimination of all traces of solvent, the product was heated to 45° C. for one hour under vacuum. The product was 3.5 grams (65% yield) of yellow, brittle powder which melted between 110–115° C. without decomposition. Analysis of the polymer indicated a number-average molecular weight of 3.15 corresponding to an average molecular weight of approximately 900.

X-ray analysis showed the polymer to be amorphous and the usual borazole bands were observed in the infrared spectrum.

(4) Condensation of B-trichloro-N-triphenylborazole with sodium sulfide

A 200 ml. flask equipped with stirrer and reflux condenser was thoroughly flushed with dry nitrogen. The flask was then charged with 10.0 grams of B-trichloro-N-triphenyl borazole, 1.89 grams of $Na_2S$, and 175 ml. of 1,2-dimethoxyethane (freshly distilled from $LiAlH_4$ in $N_2$ atmosphere). With continuous rapid stirring, the solution was heated at reflux for 24 hours. When the reaction was complete, solvent was carefully distilled off and the total solid product thoroughly dried under vacuum. The solid mixture was then transferred to a paper extraction thimble and extracted with 1,2-dimethoxyethane in a Soxhlet apparatus. The extractant was concentrated by distillation at normal pressure and dried at reduced pressure. To ensure elimination of all traces of solvent, the product was heated to 45° C. for one hour under vacuum. The product was 7.8 grams (86% yield) of yellow, brittle powder which melted between 75–110° C. without decomposition. Analysis of the polymer indicated a number-average molecular weight of 11.2 corresponding to an average molecular weight of approximately 4200.

The polymer was amorphous by X-ray analysis and gave an infrared spectrum typical of an N-phenylborazole.

(5) Condensation of B-trichloro-N-triphenylborazole with sodium disulfide

A 200 ml. flask equipped with stirrer and reflux condenser was thoroughly flushed with dry nitrogen. The flask was then charged with 10.0 grams of B-trichloro-N-triphenylborazole, 2.67 grams of $Na_2S_2$, and 175 ml. of 1,2-dimethoxyethane (freshly distilled from $LiAlH_4$ in $N_2$ atmosphere). With continuous rapid stirring, the solution was heated at reflux for 24 hours. When the reaction was complete, solvent was carefully distilled off and the total solid product thoroughly dried under vacuum. The solid mixture was then transferred to a paper extraction thimble and extracted with 1,2-dimethoxyethane in a Soxhlet apparatus. The extractant was concentrated by distillation at normal pressure and dried at reduced pressure. To ensure elimination of all traces of solvent, the product was heated to 45° C. for one hour under vacuum. The product was 7.1 grams (72% yield) of yellow, brittle powder which melted between 75–110° C. without decomposition. Analysis of the polymer indicated a number-average molecular weight of 8.7 corresponding to an average molecular weight of approximately 3500.

The X-ray diffraction pattern of the polymer showed weak lines at 9.93, 5.18, 4.72, 4.47, 3.79, 3.68, 3.64, 2.83, 2.63, and 2.13 A. The infrared spectrum was typical of an N-phenylborazole.

(6) Condensation of B-trichloro-N-triphenylborazole with sodium tetrasulfide A 200 ml. flask equipped with stirrer and reflux condenser was thoroughly flushed with dry nitrogen. The flask was then charged with 10.0 grams of B-trichloro-N-triphenylborazole, 4.23 grams of $Na_2S_4$, and 175 ml. of 1,2-dimethoxyethane (freshly distilled from $LiAlH_4$ in $N_2$ atmosphere). With continuous rapid stirring, the solution was heated at reflux for 24 hours. When the reaction was complete, solvent was carefully distilled off and the total solid product thoroughly dried under vacuum. The solid mixture was then transferred to a paper extraction thimble and extracted with 1,2-dimethoxyethane in a Soxhlet apparatus. The extractant was concentrated by distillation at normal pressure and dried at reduced pressure. To ensure elimination of all traces of solvent, the product was heated to 45° C. for one hour under vacuum. The product was 9.7 grams (85% yield) of yellow, brittle powder which melted between 75–110° C. without decomposition. Analysis of the polymer indicated a number-average molecular weight of about 10 corresponding to an average molecular weight of approximately 4000.

Weak lines at 4.67 and 3.67 A. were observed in the X-ray diffraction pattern of the polymer. The infrared spectrum was typical of an N-triphenylborazole.

(7) Condensation of B-dichloro-B-methyl-N-trimethylborazole with sodium sulfide A 200 ml. flask equipped with stirrer and reflux condenser was thoroughly flushed with dry nitrogen. The flask was then charged with 5.0 grams of B-dichloro-B-methyl-N-trimethylborazole, 1.89 grams of $Na_2S$, and 175 ml. of 1,2-dimethoxyethane (freshly distilled from $LiAlH_4$ in $N_2$ atmosphere). With continuous rapid stirring, the solution was heated at reflux for 120 hours. When the reaction was complete, solvent was carefully distilled off and the total solid product thoroughly dried under vacuum. The solid mixture was then transferred to a paper extraction thimble and extracted with 1,2-dimethoxyethane in a Soxhlet apparatus. The extractant was concentrated by distillation at normal pressure and dried at reduced pressure. To ensure elimination of all traces of solvent, the product was heated to 45° C. for one hour under vacuum. The product was 2.3 grams (56% yield) of pale yellow, brittle powder which melted between 120–125° C. without decomposition. Analysis of the polymer indicated a number-average molecular weight of 11.2 corresponding to an average molecular weight of approximately 1860.

The polymer was amorphous by X-ray analysis and gave an infrared spectrum typical of an N-methylborazole.

(8) Condensation of B-dichloro-B-methyl-N-trimethylborazole with sodium disulfide A 200 ml. flask equipped with stirrer and reflux condenser was thoroughly flushed with dry nitrogen. The flask was then charged with 5.0 grams of B-dichloro-B-methyl-N-trimethylborazole, 2.67 grams of $Na_2S_2$, and 175 ml. of 1,2-dimethoxyethane (freshly distilled from $LiAlH_4$ in $N_2$ atmosphere). With continuous rapid stirring, the solution was heated at reflux for 120 hours. When the reaction was complete, solvent was carefully distilled off and the total solid product thoroughly dried under vacuum. The solid mixture was then transferred to a paper extraction thimble and extracted with 1,2-dimethoxyethane in a Soxhlet apparatus. The extractant was concentrated by distillation at normal pressure and dried at reduced pressure. To ensure elimination of all traces of solvent, the product was heated to 45° C. for one hour under vacuum. The product was 4.2 grams (75% yield) of pale yellow, brittle powder which melted between 160–200° C. without decomposition. Analysis of the polymer indicated a number-average molecular weight of 40.0 corresponding to an average molecular weight of approximately 7920.

The polymer was amorphous by X-ray analysis and showed the borazole bands in the infrared spectrum.

(9) Condensation of B-dichloro-B-methyl-N-trimethylborazole with sodium tetrasulfide A 200 ml. flask equipped with stirrer and reflux condenser was thoroughly flushed with dry nitrogen. The flask was then charged with 5.0 grams of B-dichloro-B-methyl-N-trimethylborazole, 4.23 grams of $Na_2S_4$, and 150 ml. of 1,2-dimethoxyethane (freshly distilled from $LiAlH_4$ in $N_2$ atmosphere). With continuous rapid stirring, the solution was heated at reflux for 24 hours. When the reaction was complete, solvent was carefully distilled off and the total solid product thoroughly dried under vacuum. The solid mixture was then transferred to a paper extraction thimble and extracted with 1,2-dimethoxyethane in a Soxhlet apparatus. The extractant was concentrated by distillation at normal pressure and dried at reduced pressure. To ensure elimination of all traces of solvent, the product was heated to 45° C. for one hour under vacuum. The product was 5.6 grams (88% yield) of yellow, brittle powder which melted between 160–200° C. without decomposition. Analysis of the polymer indicated a number-average molecular weight of 200 corresponding to an average molecular weight of approximately 52,600.

X-ray analysis showed the polymer to be amorphous. The infrared spectrum was typical of an N-methylborazole.

(10) Condensation of B-dichloro-B-methyl-N-triphenylborazole with sodium sulfide A 200 ml. flask equipped with stirred and reflux condenser was thoroughly flushed with dry nitrogen. The flask was then charged with 5.0 grams of B-dichloro-B-methyl-N-triphenylborazole, 0.98 gram of $Na_2S$, and 175 ml. of 1,2-dimethoxyethane (freshly distilled from $LiAlH_4$ in $N_2$ atmosphere). With continuous rapid stirring, the solution was heated at reflux for 48 hours. When the reaction was complete, solvent was carefully distilled off and the total solid product thoroughly dried under vacuum. The solid mixture was then transferred to a paper extraction thimble and extracted with 1,2-dimethoxyethane in a Soxhlet apparatus. The extractant was concentrated by distillation at normal pressure and dried at reduced pressure. To ensure elimination of all traces of solvent, the product was heated to 45° C. for one hour under vacuum. The product was 3.5 grams (78% yield) of brittle, orange pitch which melted between 75–85° C. without decomposition. Analysis of the polymer indicated a number-average molecular weight of 10.9 corresponding to an average molecular weight of approximately 3850.

The X-ray diffraction pattern of the polymer showed weak lines at 5.53, 5.27, 4.98, 4.48, 4.23, 3.75, 3.71, 3.62, 3.60 and 3.00 A. The infrared spectrum was typical of an N-phenylborazole.

(11) Condensation of B-dichloro-B-methyl-N-triphenylborazole with sodium disulfide A 200 ml. flask equipped with stirrer and reflux condenser was thoroughly flushed with dry nitrogen. The flask was then charged with 5.0 grams of B-dichloro-B-methyl-N-triphenylborazole, 1.40 grams of $Na_2S_2$, and 175 ml. of 1,2-dimethoxyethane (freshly distilled from $LiAlH_4$ in $N_2$ atmosphere). With continuous rapid stirring, the solution was heated at reflux for 48 hours. When the reaction was complete, solvent was carefully distilled off and the total solid product thoroughly dried under vacuum. The solid mixture was then transferred to a paper extraction thimble and extracted with 1,2-dimethoxyethane in a Soxhlet apparatus. The extractant was concentrated by distillation a normal pressure and dried at reduced pressure. To ensure elimination of all traces of solvent, the product was heated to 45° C. for one hour under vacuum. The product was 4.3 grams (88% yield) of yellow, brittle powder which melted between 85–110° C. without decomposition. Analysis of the polymer indicated a number-average molecular weight of 12.8 corresponding to an average molecular weight of approximately 4900.

Weak lines were observed at 5.28, 4.99, 4.48, 3.95, 3.72, 3.03, 2.99, 2.88, 2.78, 2.69 and 2.63 A. in the X-ray diffraction pattern of the polymer. The infrared spectrum showed the usual borazole and phenyl bands.

(12) Condensation of B-dichloro-B-methyl-N-triphenylborazole with sodium tetrasulfide A 200 ml. flask equipped with stirrer and reflux condenser was thoroughly flushed with dry nitrogen. The flask was then charged with 5.0 grams of B-dichloro-B-methyl-N-triphenylborazole, 2.22 grams of $Na_2S_4$, and 175 ml. of 1,2-dimethoxyethane (freshly distilled from $LiAlH_4$ in $N_2$ atmosphere). With continuous rapid stirring, the solution was heated at reflux for 48 hours. When the reaction was complete, solvent was carefully distilled off and the total solid product thoroughly dried under vacuum. The solid mixture was then transferred to a paper extraction thimble and extracted with 1,2-dimethoxyethane in a Soxhlet apparatus. The extractant was concentrated by distillation at normal pressure and dried at reduced pressure. To ensure elimination of all traces of solvent, the product was heated to 45° C. for one hour under vacuum. The product was 5.0 grams (88% yield) of yellow, brittle powder which melted between 85–110° C. without decomposition. Analysis of the polymer indicated a number-average molecular weight of 14.1 corresponding to an average molecular weight of approximately 6300.

The X-ray pattern of the polymer contained weak lines at 7.00, 6.12, 5.24, 4.91, 4.61, 4.53, 4.47, 4.27, 4.06, 3.97, 3.72, 3.65, 3.54, 3.17 and 3.04 A. The infrared spectrum was typical of an N-phenylborazole.

(13) Amination of a borazole-sulfide polymer

Two grams of a disulfide-linked polymer (containing 20.9 percent chlorine) was dissolved in 75 ml. of freshly distilled tetrahydrofuran and dimethylamine was passed into the solution at 25° C. for 15 minutes at a rate of 500 cc. per minute. Reaction ensued with a slight temperature rise and precipitation of white, very flocculent material. The dark red solution was stirred one hour and allowed to settle. The mixture was filtered and the insoluble residue washed twice with 35 ml. portions of tetrahydrofuran. The combined filtrates were then evaporated to dryness to yield 1.5 grams of orange-red polymer. Analysis of the polymer showed it to contain less than 0.3 percent chlorine, indicating that essentially all of the chlorine had been replaced by $—N(CH_3)_2$ groups. The polymer was elastic and dissolved readily in water.

The soluble polymers obtained from B-trichloroborazoles are sensitive to water. Initial attack by water is at the B—Cl bonds with subsequent destruction of the borazole ring until the entire polymer structure has been broken down. The polysulfide linked polymers split out part of their sulfur as free sulfur when hydrolyzed.

All the polymers melt without decomposition below 200° C. The polymers darken in color and the tetrasulfide linked polymers split out sulfur about 200° C. Under high vacuum, residual monomer and yellow oils are distilled out above 100° C.

The polymers of the present invention can be formed into films by conventional film-making techniques. Since these polymers are oxidation-resistant, they are particularly valuable in wrapping and packaging applications.

TABLE I

| Reactants | Run | Solvent [1] | Reaction Time (Hrs.) | Percent Yield of Soluble Polymer | Analysis | | | | | |
|---|---|---|---|---|---|---|---|---|---|---|
| | | | | | Percent B | Percent N | Percent Cl | Percent S | Percent C | Percent H |
| Cl$_3$[BN]$_3$(CH$_3$)$_3$—Na$_2$S | 1 | 121 | 120 | 53 | 15.8 | 19.7 | 27.3 | 11.6 | 19.2 | 5.54 |
| | 2 | THF | 65 | 65 | 13.2 | | 32.5 | 8.0 | | |
| | 3 | THF | 648 | 40 | 16.3 | | 23.9 | 10.7 | | |
| Cl$_3$[BN]$_3$(CH$_3$)$_3$—Na$_2$S$_2$ | 1 | 121 | 120 | 70 | 14.1 | 17.3 | 16.3 | 25.8 | 17.1 | 5.49 |
| | 2 | THF | 72 | 80 | 11.9 | | 24.6 | 19.8 | | |
| | 3 | THF | 648 | 50 | 13.8 | | 20.9 | 22.9 | | |
| Cl$_3$[BN]$_3$(CH$_3$)$_3$—Na$_2$S$_4$ | 1 | THF | 24 | 65 | 12.1 | 15.7 | 21.2 | 34.5 | 15.5 | 3.83 |
| | 2 | THF | 65 | 70 | 13.2 | | 23.2 | 26.5 | | |
| | 3 | THF | 648 | 50 | 10.9 | | 18.1 | 36.2 | | |
| Cl$_3$[BN]$_3$(C$_6$H$_5$)$_3$—Na$_2$S | 1 | 121 | 24 | 86 | 8.94 | | 11.5 | 4.91 | 56.7 | 5.76 |
| Cl$_3$[BN]$_3$(C$_6$H$_5$)$_3$—Na$_2$S$_2$ | 1 | 121 | 24 | 72 | 7.99 | 9.38 | 11.7 | 10.8 | 50.2 | 5.36 |
| Cl$_3$[BN]$_3$(C$_6$H$_5$)$_3$—Na$_2$S$_4$ | 1 | 121 | 24 | 85 | 6.65 | 7.65 | 6.46 | 28.7 | 46.0 | 4.66 |

| Reactants | Run | Extent [2] of Reaction P | Number [3] Average Molecular Wt. | Weight, Average Molecular Wt. | Physical State of Polymer | Color of Polymer | M.P., °C. |
|---|---|---|---|---|---|---|---|
| Cl$_3$[BN]$_3$(CH$_3$)$_3$—Na$_2$S | 1 | 0.473 | 3.44 | 600 | Resin | Pale Yellow | 90–95 |
| | 2 | 0.410 | 2.60 | 500 | Wax | Yellow | 70–100 |
| | 3 | 0.549 | 5.71 | 1,000 | Resin | Yellow-Orange | 80–150 |
| Cl$_3$[BN]$_3$(CH$_3$)$_3$—Na$_2$S$_2$ | 1 | 0.646 | 31.30 | 6,500 | do | Yellow | 105–125 |
| | 2 | 0.568 | 6.81 | 1,500 | Wax | Orange | 70–100 |
| | 3 | 0.543 | 5.38 | 1,200 | Resin | Yellow-Orange | 120–140 |
| Cl$_3$[BN]$_3$(CH$_3$)$_3$—Na$_2$S$_4$ | 1 | 0.464 | 3.15 | 900 | do | Pale Yellow | 110–115 |
| | 2 | 0.454 | 3.16 | 900 | do | Orange | 160–170 |
| | 3 | 0.496 | 3.91 | 1,100 | do | do | 120–140 |
| Cl$_3$[BN]$_3$(C$_6$H$_5$)$_3$—Na$_2$S | 1 | 0.607 | 11.20 | 4,200 | do | Yellow | 75–110 |
| Cl$_3$[BN]$_3$(C$_6$H$_5$)$_3$—Na$_2$S$_2$ | 1 | 0.589 | 8.70 | 3,500 | do | do | 75–110 |
| Cl$_3$[BN]$_3$(C$_6$H$_5$)$_3$—Na$_2$S$_4$ | 1 | 0.704 | 10 | 4,000 | do | do | 75–110 |

[1] 121 = 1,2-dimethoxyethane; THF — tetrahydrofuran.
[2] Extent of reaction, P = fraction of chlorine in monomer consumed by reaction.
[3] Value equal to $\dfrac{1}{1-\dfrac{f_p}{2}}$; where $f$ = functionality of monomer = 3.

TABLE II

| Reactants | Run | Solvent [1] | Reaction Time (Hrs.) | Percent Yield of Soluble Polymer | Analysis | | | | | |
|---|---|---|---|---|---|---|---|---|---|---|
| | | | | | Percent B | Percent N | Percent Cl | Percent S | Percent C | Percent H |
| Cl$_2$(CH$_3$)[BN]$_3$(CH$_3$)$_3$—Na$_2$S | 1 | 121 | 120 | 56 | 19.9 | 24.2 | 3.98 | 15.9 | 29.5 | 7.44 |
| | 2 | 121 | 120 | 73 | 16.5 | 24.5 | 3.05 | 13.2 | 26.5 | 7.40 |
| | 3 | 121 | 24 | 75 | 19.3 | 25.8 | 9.88 | 13.5 | | |
| Cl$_2$(CH$_3$)[BN]$_3$(CH$_3$)$_3$—Na$_2$S$_2$ | 1 | 121 | 120 | 75 | 16.6 | 20.1 | 0.92 | 24.3 | 24.8 | 6.74 |
| | 2 | 121 | 120 | 74 | 15.7 | 20.4 | 0.25 | 24.1 | 24.7 | 6.60 |
| | 3 | 121 | 24 | 83 | 15.9 | 19.1 | 1.10 | 30.5 | | |
| Cl$_2$(CH$_3$)[BN]$_3$(CH$_3$)$_3$—Na$_2$S$_4$ | 1 | 121 | 24 | 88 | 12.7 | 17.0 | 0.10 | 51.9 | 17.9 | 4.56 |
| | 2 | 121 | 120 | 87 | 11.1 | 16.5 | 0.10 | 41.6 | 18.9 | 5.10 |
| Cl$_2$(CH$_3$)[BN]$_3$(C$_6$H$_5$)$_3$—Na$_2$S | 1 | 121 | 48 | 78 | 8.27 | 9.76 | 2.58 | 4.41 | 54.0 | 5.52 |
| Cl$_2$(CH$_3$)[BN]$_3$(C$_6$H$_5$)$_3$—Na$_2$S$_2$ | 1 | 121 | 48 | 88 | 8.33 | 10.2 | 2.12 | 12.6 | 48.2 | 5.78 |
| Cl$_2$(CH$_3$)[BN]$_3$(C$_6$H$_5$)$_3$—Na$_2$S$_4$ | 1 | 121 | 48 | 88 | 7.65 | 8.27 | 1.94 | 24.4 | 38.3 | 4.86 |

| Reactants | Run | Extent [2] of Reaction P | Number [3] Average Molecular Wt. | Weight, Average Molecular Wt. | Physical State of Polymer | Color of Polymer | M.P., °C. |
|---|---|---|---|---|---|---|---|
| Cl$_2$(CH$_3$)[BN]$_3$(CH$_3$)—Na$_2$S | 1 | 0.911 | 11.2 | 1,860 | Resin | Pale Yellow | 120 |
| | 2 | 0.911 | 11.2 | 1,860 | Pitch | Yellow | 65–85 |
| | 3 | 0.707 | 3.41 | 568 | Resin | do | 85–100 |
| Cl$_2$(CH$_3$)[BN]$_3$(CH$_3$)—Na$_2$S$_2$ | 1 | 0.975 | 40.0 | 7,920 | do | do | 160–200 |
| | 2 | 0.993 | 143.0 | 28,300 | do | do | 180–215 |
| | 3 | 0.970 | 33.4 | 6,580 | do | do | 100–150 |
| Cl$_2$(CH$_3$)[BN]$_3$(CH$_3$)—Na$_2$S$_4$ | 1 | 0.995 | 200 | 52,600 | do | do | 160–200 |
| | 2 | 0.995 | 200 | 52,600 | do | do | 185–215 |
| Cl$_2$(CH$_3$)[BN]$_3$(C$_6$H$_5$)$_3$—Na$_2$S | 1 | 0.908 | 10.9 | 3,850 | Pitch | Orange | 75–85 |
| Cl$_2$(CH$_3$)[BN]$_3$(C$_6$H$_5$)$_3$—Na$_2$S$_2$ | 1 | 0.922 | 12.8 | 4,900 | Resin | Yellow | 85–110 |
| Cl$_2$(CH$_3$)[BN]$_3$(C$_6$H$_5$)$_3$—Na$_2$S$_4$ | 1 | 0.929 | 14.1 | 6,300 | do | do | 85–110 |

[1] 121 = 1,2-dimethoxyethane.
[2] Extent of reaction, P = fraction of chlorine in monomer consumed by reaction.
[3] Value equals $\dfrac{1}{1-\dfrac{f_p}{2}}$; where $f$ = functionality of monomer = 2.

The compounds of the invention find utility as molding compositions and as films.

What is claimed is:

1. A borazole-sulfur polymer having the recurring group:

$$[-(S_x)_y Cl_{3-y}(BN)_3 R_3]_n$$

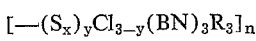

wherein R is a member selected from the group consisting of hydrogen, lower alkyl and phenyl radicals; y is a number ranging from 1 to 3, x is an integer ranging from 1 to 4 inclusive, (BN) is the borazole ring and n is a number ranging from 2 to about 20,000.

2. A polymeric product as described in claim 1, wherein n ranges from 2 to about 200.

3. A polymeric product as described in claim 1, wherein the R group is a methyl radical, x ranges from 1 to 2, said product having a molecular weight ranging from about 600 to about 6500.

4. A product as described in claim 1, wherein said R group is a methyl radical, x is 4, said product having a molecular weight ranging from 900 to 1100.

5. A product as defined in claim 1, wherein said R group is a phenyl radical, x is 1, said product having a molecular weight of around 4200.

6. A product as defined in claim 1 wherein said R group is a phenyl radical, x is 2, said product having a molecular weight of around 3500.

7. A product as defined in claim 1 wherein said R group is a phenyl radical, x is 4, said product having a molecular weight around 4000.

8. A borazole-sulfur polymer having the recurring group:

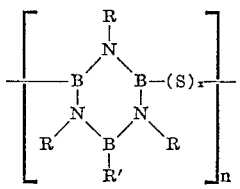

wherein R is a member selected from the group consisting of hydrogen, lower alkyl and phenyl radicals; R' is a member selected from the group consisting of hydrogen, lower alkyl, phenyl, and amino radicals, x is an integer ranging from 1 to 4 inclusive, and n is a number ranging from 2 to 20,000.

9. A product as defined in claim 8 wherein both R and R' are methyl groups and x is 1, said product having an average molecular weight ranging from about 560 to about 1860.

10. A product as defined in claim 8 wherein both R and R' are methyl groups and x is 2, said product having an average molecular weight ranging from about 6500 to 28,000.

11. A product as defined in claim 8, wherein both R and R' are methyl groups and x is 4, said product having an average molecular weight of around 52,000.

12. A product as defined in claim 8, wherein R' is a methyl radical, R is a phenyl radical, x is 1, said product having an average molecular weight of around 3800.

13. A product as defined in claim 8 wherein R' is a methyl radical, R is a phenyl radical, x is equal to 2, said product having an average molecular weight of about 4900.

14. A product as defined in claim 8 wherein said R' is methyl, R is phenyl, x is 4, said product having an average molecular weight of around 6000.

15. A method for preparing borazole-sulfur polymers comprising heating to reflux, under anhydrous and oxygen-free conditions, a borazole having the general formula:

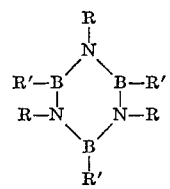

wherein R is a member selected from the group consisting of hydrogen, lower alkyl and phenyl radicals, and R' is a member selected from the group consisting of hydrogen, halogen, lower alkyl and phenyl radicals, with a sulfur-containing compound which is a member of the group consisting of sodium sulfide, sodium disulfide, and sodium tetrasulfide in a solvent selected from the group consisting of the high boiling ethers and tetrahydrofuran, the molar ratio of said sulfur-containing compound to said borazole not exceeding 1.5 and after from 24 to 150 hours removing said solvent to recover said polymers.

16. The method of claim 15 wherein said sulfur-containing compound is sodium sulfide.

17. The method of claim 15 wherein said sulfur-containing compound is sodium disulfide.

18. The method of claim 15 wherein said sulfur-containing compound is sodium tetrasulfide.

19. A method for preparing borazole-sulfur polymers which comprises reacting, under anhydrous and oxygen-free conditions, B-trichloro-N-trimethylborazole with a sulfur-containing compound which is a member of the group consisting of sodium sulfide, sodium disulfide, and sodium tetrasulfide in a solvent selected from the group consisting of the high-boiling ethers and tetrahydrofuran, the molar ratio of said sulfur-containing compound to said borazole not exceeding 1.5, and after from 24 to 150 hours removing said solvent to recover said polymers.

20. A method for preparing borazole-sulfur polymers which comprises reacting, under anhydrous and oxygen-free conditions, B-trichloro-N-triphenylborazole with a sulfur-containing compound which is a member of the group consisting of sodium sulfide, sodium disulfide, and sodium tetrasulfide in a solvent selected from the group consisting of the high-boiling ethers and tetrahydrofuran, the molar ratio of said sulfur-containing compound to said borazole not exceeding 1.5, and after from 24 to 150 hours removing said solvent to recover said polymers.

No references cited.

LEON J. BERCOVITZ, *Primary Examiner.*
HAROLD N. BURSTEIN, *Examiner.*